United States Patent
Cheong

(10) Patent No.: US 8,266,093 B2
(45) Date of Patent: Sep. 11, 2012

(54) DATA PROCESSING APPARATUS AND METHOD FOR CONSTRUCTING INTERACTIVE CONTENTS AND RECORDING MEDIA

(75) Inventor: Yun-Gyung Cheong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 12/432,067

(22) Filed: Apr. 29, 2009

(65) Prior Publication Data

US 2010/0094801 A1 Apr. 15, 2010

(30) Foreign Application Priority Data

Oct. 14, 2008 (KR) .................. 10-2008-0100630

(51) Int. Cl.
*G06F 17/00* (2006.01)
*G06F 15/18* (2006.01)
(52) U.S. Cl. .......................... 706/55; 706/12
(58) Field of Classification Search .............. None
See application file for complete search history.

(56) References Cited

U.S. PATENT DOCUMENTS

| | | | |
|---|---|---|---|
| 5,517,432 A * | 5/1996 | Chandra et al. ........... | 703/14 |
| 7,840,913 B1 * | 11/2010 | Agrawal et al. ........... | 703/22 |
| 2007/0099684 A1 | 5/2007 | Butterworth | |

FOREIGN PATENT DOCUMENTS

| | | |
|---|---|---|
| JP | 1998-508407 | 8/1998 |
| JP | 2004-021469 | 1/2004 |
| JP | 2008-015558 | 1/2008 |
| KR | 10-2003-0041948 | 5/2003 |
| KR | 10-2004-0052330 | 6/2004 |
| KR | 10-2007-0061226 | 6/2007 |
| WO | WO 2006/131887 | 12/2006 |
| WO | WO 2008/072739 | 6/2008 |

* cited by examiner

*Primary Examiner* — Alan Chen
*Assistant Examiner* — Paulinho E Smith
(74) *Attorney, Agent, or Firm* — NSIP Law

(57) ABSTRACT

Disclosed are an apparatus and method of constructing interactive contents. The data processing apparatus may transit a branching graph into a planning domain, wherein information on nodes and arcs of the branching graph may be classified to generate property and class information, and the classified properties may be used as pre-conditions of a plan operator on the planning domain.

14 Claims, 5 Drawing Sheets

| Incoming node ID | Input event | Result |
|---|---|---|
| S2 | MouseClicked(Obj1) | E1 |
| S1 | MouseClicked(Obj2) | E1 |
| S4 | MouseClicked(Obj3) | E1 |

FIG.6

| Number | Property 1 (Incoming Node) | Property 2 (Arc Information) | Class (Outgoing Node) |
|---|---|---|---|
| 1 | S | e3 | S1 |
| 2 | S | e1 | S1 |
| 3 | S | e2 | S3 |
| 4 | S1 | e2 | S2 |
| 5 | S1 | e9 | S4 |
| 6 | S3 | e6 | S4 |
| 7 | S3 | e2 | S2 |
| 8 | S2 | e4 | E1 |
| 9 | S1 | e4 | E1 |
| 10 | S4 | e4 | E1 |
| 11 | S4 | e8 | E2 |
| 12 | S3 | e7 | E2 |

601

| Number | Pre-condition | Operator Name | Post-condition |
|---|---|---|---|
| 1 | Input(e3) | S1 | Completed(S1) |
| 2 | Input(e1) | S1 | Completed(S1) |
| 3 | Input(e2) | S3 | Completed(S3) |
| 4 | Input(e2)&Completed(S1) | S2 | Completed(S2) |
| 5 | Input(e9) | S4 | Completed(S4) |
| 6 | Input(e6) | S4 | Completed(S4) |
| 7 | Input(e2)&Completed(S3) | S2 | Completed(S2) |
| 8 | Input(e4) | E1 | Completed(E1) |
| 9 | Input(e4)&Completed(S2) | E1 | Completed(E1) |
| 10 | Input(e4)&Completed(S4) | E1 | Completed(E1) |
| 11 | Input(e8) | E2 | Completed(E2) |
| 12 | Input(e7) | E2 | Completed(E2) | ns and a

DATA PROCESSING APPARATUS AND METHOD FOR CONSTRUCTING INTERACTIVE CONTENTS AND RECORDING MEDIA

CROSS REFERENCE TO RELATED APPLICATIONS

This application claims the benefit under 35 U.S.C. §119(a) of Korean Patent Application No. 10-2008-100630, filed on Oct. 14, 2008 in the Koran Intellectual Property Office, the disclosure of which is incorporated herein in its entirety by reference.

BACKGROUND

1. Field

The following description relates to constructing contents, and more particularly, to a data processing apparatus and method for constructing interactive contents.

2. Description of the Related Art

Interactive contents refer to contents that are changed in response to interaction with a user. Examples of interactive contents include various types of games, flash animation, and interactive movies, in which a variety of events occur in response to a predetermined input by a user through an input device such as a touch screen and a mouse.

Methods of constructing interactive contents include a branch scheme and a planning scheme.

The branch scheme creates plurality of branchable scenarios using nodes and arcs. In the branch scheme, different contents are provided to a user, according to the arcs selected by a user. The planning scheme plans procedures to reach a goal state from a given current state and automatically constructs a series of corresponding contents for the goal state. The planning scheme may be specified as forward planning or backward planning, according to an exploring direction of an arc.

However, the above methods for constructing interactive contents have certain disadvantages. In the branch scheme, all interactions that a user may perform at a specific node are predicted and set in advance, and in the planning scheme, procedures are not intuitively constructed, and thus a significant time and effort may be exerted to achieve a goal state.

SUMMARY

In one general aspect, a data processing apparatus for constructing interactive content includes a directed acyclic graph (DAG) receiving unit configured to receive interactive contents in a DAG format, a DAG analyzing unit configured to classify nodes and arcs of the DAG and further configured to generate training data having at least one property and at least one class, and a planning domain constructing unit configured to construct a planning domain based on the at least one property or the at least one class.

The at least one property may include information of a first one of the nodes and one of the arcs of the DAG, and the at least one class may include information of a second one of the nodes at a moment of matching the one of the arcs with the first one of the nodes.

The planning domain constructing unit may be configured to characterize plan operators of the planning domain based on the at least one class.

The planning domain constructing unit may be configured to characterize each plan operator differently, according to the at least one class.

The planning domain constructing unit may be configured to specify a post-condition of each plan operator of the planning domain based on a resulting state by executing an action script corresponding to an operator in a particular domain, the particular domain corresponding to one of the nodes.

The planning domain constructing unit may be configured to specify each pre-condition of the planning domain based on the at least property. The pre-condition may include the at least property and a post-condition of a different plan operator.

In another general aspect, a data processing method for constructing interactive content includes receiving, by a directed acrylic graph (DAG) receiving unit, interactive contents in a DAG format, classifying, by a DAG analyzing unit, nodes and arcs of the DAG and generating training data having at least one property and at least one class, and constructing, by a planning domain constructing unit, a planning domain based on the at least one property and the at least one class.

The at least one property may include information regarding a first one of the nodes and one of the arcs of the DAG; and the at least one class may include information of a second one of the nodes at a moment of mapping the one of the arcs onto the incoming node.

The constructing of the planning domain may include characterizing a plan operator corresponding to the at least one class, specifying a post-condition by executing an action script corresponding to the plan operator, and specifying a pre-condition based on the at least one property.

Each plan operator may be characterized differently, according to the at least one class.

The pre-condition may comprise arc information from the training data.

The pre-condition may comprise arc information and post-condition information from the training data.

In still another aspect, a computer readable recording medium storing a program for executing a data processing method includes instructions to cause a computer to receive interactive contents in a directed acyclic graph (DAG) format, classify nodes and arcs of the DAG and generate training data having at least property and at least one class, and construct a planning domain based on the at least the property and the at least one class.

Other features will become apparent to those skilled in the art from the following detailed description, the drawings, and the claims.

BRIEF DESCRIPTION OF THE DRAWINGS

FIG. 6 is a diagram illustrating an exemplary planning domain table.

Figure 1:
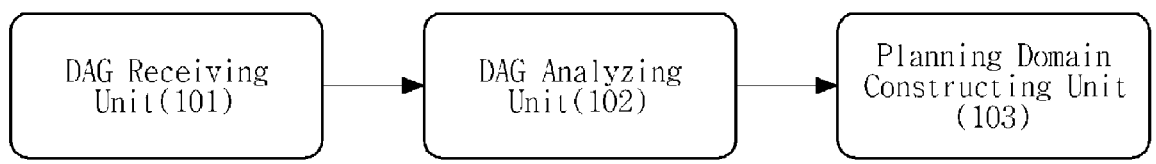
FIG. 1 is a diagram illustrating an exemplary data processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted to increase clarity and conciseness.

FIG. 1 is a diagram illustrating an exemplary data processing apparatus 100 for constructing interactive contents. Referring to FIG. 1, the data processing apparatus includes a directed acyclic graph (DAG) receiving unit 101, a DAG analyzing unit 102, and a planning domain constructing unit 103.

The DAG input unit 101 receives interactive contents data which is represented as a directed acyclic graph (DAG).

A directed acyclic graph (DAG) refers to a graph that has no directed cyclic relation between nodes and arcs. The DAG is suitable for creating interactive contents since it can be represented in various branchable scenarios by the nodes and arcs. As one example, interactive contents may vary or may generate various events in response to interaction with a user (for example, through an input device or a natural language interface). Further, a state of each contents may correspond to a node and the user interaction may correspond to an arc.

Figure 2:
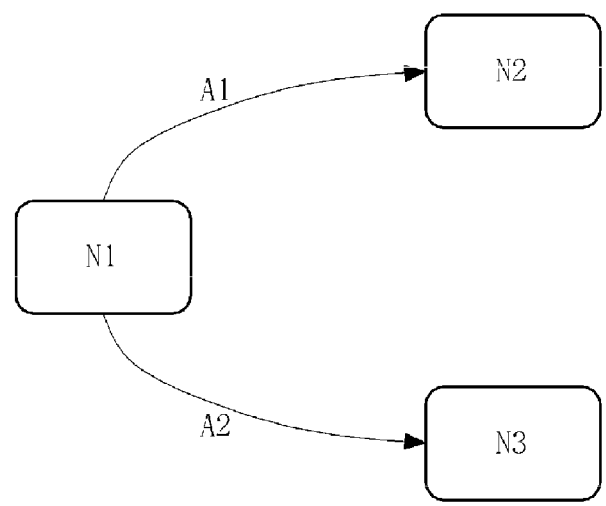
FIG. 2 is a diagram illustrating an exemplary directed acyclic graph.

FIG. 2 is a diagram illustrating an exemplary DAG, described with reference to FIG. 1. In FIG. 2, nodes are denoted by N1, N2, and N3 and arcs are denoted by A1 and A2, respectively. Herein, if N1 is defined as an incoming node, N2 is assigned as an outgoing node when N1 is connected by A1, and N3 is assigned as an outgoing node when N1 is connected by A2.

In response to each node corresponding to each contents and each arc corresponding to user interaction, the initial N1 node is transited to the N2 node upon reception of A1 input. As one example, it is possible that the N1 node may be set to be transited to either the node or the N3 node in response to a user clicking a facing object at the N1 node (the clicking may correspond to either A1 or A2).

Referring to FIG. 1 again, the DAG analyzing unit 102 may analyze an input DAG by use of a classification method. As one example, the DAG analyzing unit 102 may receive information regarding the nodes and arcs of the DAG as shown in FIG. 2, and classify the received information to generate training data having property information and class information.

Figure 3:
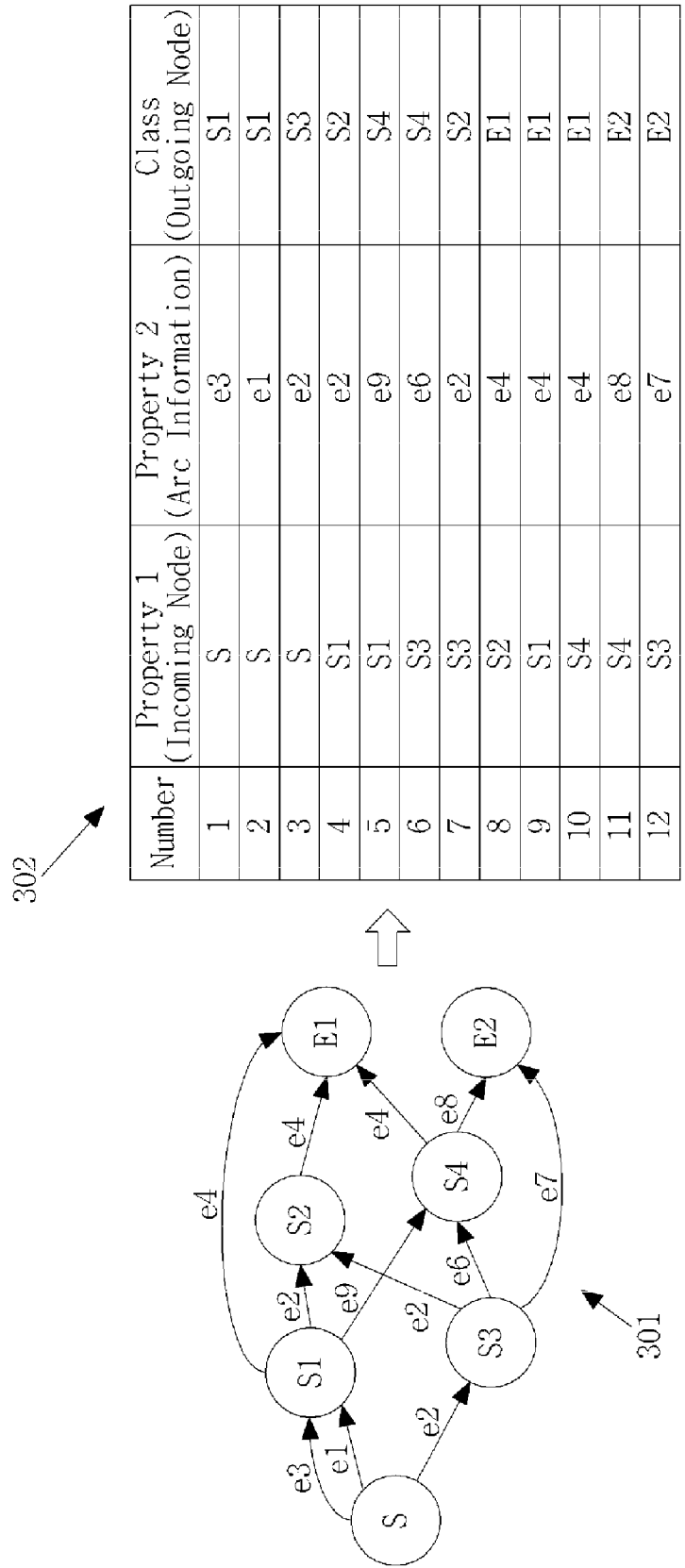
FIG. 3 is a diagram illustrating an exemplary directed acyclic graph and an exemplary training data table.

FIG. 3 is a diagram illustrating an exemplary DAG analyzing unit 102 generating exemplary training data. In FIG. 3, reference numeral 301 represents an example of DAG data, and reference numeral 302 represents training data corresponding to the DAG data 301.

Referring to FIG. 3, DAG data 301 includes information regarding nodes and arc. The DAG data 301 is converted into the training data 302 by the DAG analyzing unit 102, and the training data 302 includes property information and class information.

Property information may include various properties, and, as shown in FIG. 3, an incoming node may be used as a first property and arc information may be used as a second property. Further, a value based on matching the arc information to the incoming node, which is an outgoing node, may be used as a class. As one example, referring to the first data of the training data 302, a class is S1 and corresponding properties are S and e3, where S is an incoming node and e3 is arc information. The class may be characterized as a resulting value by matching the arc information e3 to the incoming node S, which is outgoing node.

Furthermore, the DAG analyzing unit 102 may represent transitions from different nodes to the same final node as a single identical transition. As one example, for the eighth to tenth data, regardless of the incoming node, the data is transited into the E1 node, and thus those pieces of data may be classified as a single piece of data based on e4→E1.

Figures 4, 5:
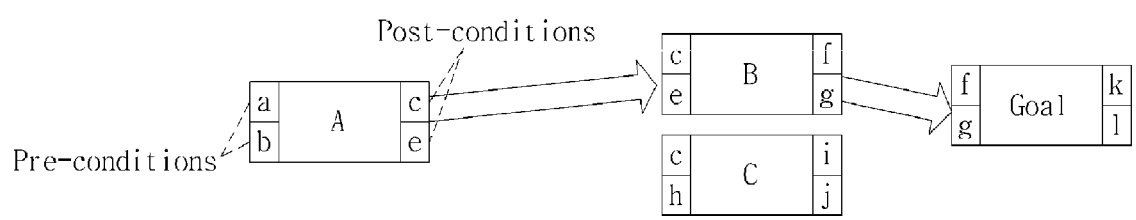
FIG. 4 is a diagram illustrating an exemplary training data table.
FIG. 5 is a diagram illustrating an exemplary planning domain.

FIG. 4 is a diagram illustrating exemplary training data. Referring to FIG. 4, an incoming event is used as a second property, and each property contains a definite predicate. As one example, in the case of first data, an initial S2 node is transited into the E1 node in response to a user clicking of a first object with a mouse. In this case, since an incoming node is transited into the E1 node regardless of the object, it may be generalized that transition to the E1 node takes place once the mouse is clicked.

Referring to FIG. 1 again, the planning domain constructing unit 103 may construct a planning domain using the training data described above.

The planning domain refers to basic data in a planning scheme, which constructs a series of contents automatically by planning procedures on the basis of a current state and a goal state. Also, the planning domain may consist of a plurality of plan operators.

FIG. 5 is a diagram illustrating an exemplary planning domain. Referring to FIG. 5, a story as a unit of a node A can proceed when pre-conditions 'a' and 'b' are satisfied. Then, when the story of the node A is complete, post-conditions 'c' and 'e' are satisfied. Subsequently, the satisfied 'c' and 'e', which become pre-conditions of a node B, enables a story of the node B to proceed. Once the story of the node B is complete, 'f' and 'g' as post-conditions of the node B are satisfied, which allows reaching a goal state that has 'f' and 'g' as pre-conditions. The names A, B, and C assigned to the nodes may be operator names in each domain.

FIG. 6 is a diagram illustrating an exemplary construction of a planning domain. This method may construct a planning domain 601 using the training data 302 in FIG. 3.

Referring to FIG. 6, the planning domain 601 includes an operator name, a pre-condition, and a post-condition.

The operator name may be configured to correspond to each piece of class information of the training data 302. As one example, in the case of a first plan operator of the planning domain 601, the first plan operator may be named S1, similar to the class information S1 of the first data of the training data 302. Moreover, although operator names, respectively, correspond to classes, it is possible for the same classes to have different operator names if properties of the classes are different from each other. As one example, the second plan operator of the planning domain 601 corresponds to the second data of the training data 302, but has a different operator name, S1, since the properties are different between the second plan operator and the second data.

The post-condition is characterized as a resulting state by executing an action script, which acts as an operator, at each domain state. As one example, in response to the action script for S1 corresponding to 'Agent A move to place B', its post-condition would contain a state describing the agent A being at the place B (e.g., at (A, B)). As another example, the system may attach a default post-condition to each operator such that a changed state of the first plan operator of the planning domain 601 is shown as 'completed (S1)' after an S1 operator is executed.

The pre-condition may be specified by use of properties included with training data 302. As one example, the first plan operator of the planning domain 601 may have 'input (e3)' as a pre-condition, which is set to correspond to the arc information of the first data of the training data 301. The pre-condition, 'input (e3)' may indicate an input of 'e3', and an 'e3' action may be set in various ways.

Furthermore, the pre-condition may include property information and a post-condition. If the third and fourth data of the planning domain 601 are taken as one example, while the third data may designate only arc information as a pre-condition, the fourth data may have an intersection of arc information and a post-condition of an incoming node as the pre-condition, since the third and fourth nodes may have the same pre-condition if the fourth node has a pre-condition designated only by arc information.

Figure 7:
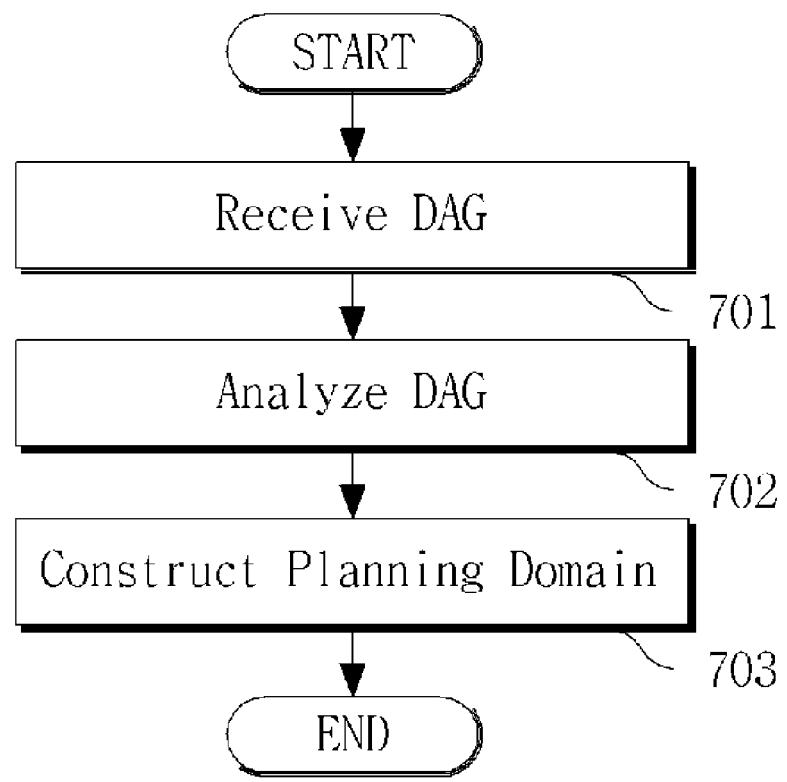
FIG. 7 is a flow chart illustrating exemplary data processing procedures.

FIG. 7 is a flow chart illustrating exemplary data processing procedures.

In operation 701, a DAG is received. The DAG may include interactive contents information. As one example, as shown in FIG. 2, each contents' state and an input value for state transition are mapped onto a node and an arc, respectively.

In operation 702, the input DAG is analyzed and training data is generated, including property information and class information. The property information may be an incoming node of the DAG and information on the arc, and the class information may be characterized as an outgoing node when the arc is mapped onto the incoming node. As one example, as shown in FIG. 3, the DAG analyzing unit 102 may generate the training data.

In operation 703, a planning domain is constructed based on the analyzed training data. The planning domain includes an operator name and a pre-condition and post-condition of a corresponding operator at each domain. The property information may be used as a pre-condition to build the planning domain. As one example, the training data as shown in FIG. 3 may be utilized to generate the planning domain shown in FIG. 6.

According to the above description, interactive contents information stored in the form of a DAG may be efficiently re-used, and a planning domain may be automatically constructed, to provide more flexible construction of interactive contents.

According to the above description, a branching graph may be automatically changed into a planning domain, to provide more flexible interaction and easier re-use of stored information.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing apparatus for constructing interactive content, comprising:
    a directed acyclic graph (DAG) receiving unit configured to receive interactive contents represented as a DAG;
    a DAG analyzing unit configured to classify nodes and arcs of the DAG and further configured to convert the DAG into training data having at least one property corresponding to the nodes or the arcs and at least one class corresponding to the nodes; and
    a planning domain constructing unit configured to construct a planning domain based on the training data,
    wherein the planning domain is defined as basic data in a planning scheme related to the interactive contents.

2. The data processing apparatus of claim 1, wherein:
    the at least one property comprises information of a first one of the nodes and one of the arcs of the DAG; and
    the at least one class comprises information of a second one of the nodes at a moment of matching the one of the arcs with the first one of the nodes.

3. The data processing apparatus of claim 1, wherein the planning domain constructing unit is configured to characterize plan operators of the planning domain based on the at least one class.

4. The data processing apparatus of claim 3, wherein the planning domain constructing unit is configured to characterize each plan operator differently, according to the at least one class.

5. The data processing apparatus of claim 1, wherein the planning domain constructing unit is configured to specify a post-condition of each plan operator of the planning domain based on a resulting state by executing an action script corresponding to an operator in a particular domain, the particular domain corresponding to one of the nodes.

6. The data processing apparatus of claim 1, wherein the planning domain constructing unit is configured to specify each pre-condition of the planning domain based on the at least one property.

7. The data processing apparatus of claim 6, wherein the pre-condition includes the at least one property and a post-condition of a different plan operator.

8. A data processing method for constructing interactive content, comprising:
    receiving, by a directed acrylic graph (DAG) receiving unit, interactive contents represented as a DAG;
    classifying, by a DAG analyzing unit, nodes and arcs of the DAG and converting the DAG into training data having at least one property corresponding to the nodes or the arcs and at least one class corresponding to the nodes; and
    constructing, by a planning domain constructing unit, a planning domain based on the training data,
    wherein the planning domain is defined as basic data in a planning scheme related to the interactive contents.

9. The data processing method of claim 8, wherein:

the at least one property comprises information regarding a first one of the nodes and one of the arcs of the DAG; and the at least one class comprises information of a second one of the nodes at a moment of mapping the one of the arcs onto the incoming node.

10. The data processing method of claim 8, wherein the constructing of the planning domain comprises:

characterizing a plan operator corresponding to the at least one class;

specifying a post-condition by executing an action script corresponding to the plan operator; and specifying a pre-condition based on the at least one property.

11. The data processing method of claim 10, wherein each plan operator is characterized differently, according to the at least one class.

12. The data processing method of claim 10, wherein the pre-condition comprises arc information from the training data.

13. The data processing method of claim 10, wherein the pre-condition comprises arc information from the training data and post-condition.

14. A computer readable recording medium storing a program for executing a data processing method, comprising instructions to cause a computer to:

receive interactive contents represented as a directed acyclic graph (DAG);

classify nodes and arcs of the DAG and convert the DAG into training data having at least property corresponding to the nodes or the arcs and at least one class corresponding to the nodes; and construct a planning domain based on the training data, wherein the planning domain is defined as basic data in a planning scheme related to the interactive contents.

* * * * *